C. & G. TRUNK.
NUT SCOURING AND POLISHING MACHINE.
APPLICATION FILED DEC. 15, 1916.
1,231,100.
Patented June 26, 1917.
2 SHEETS—SHEET 1.
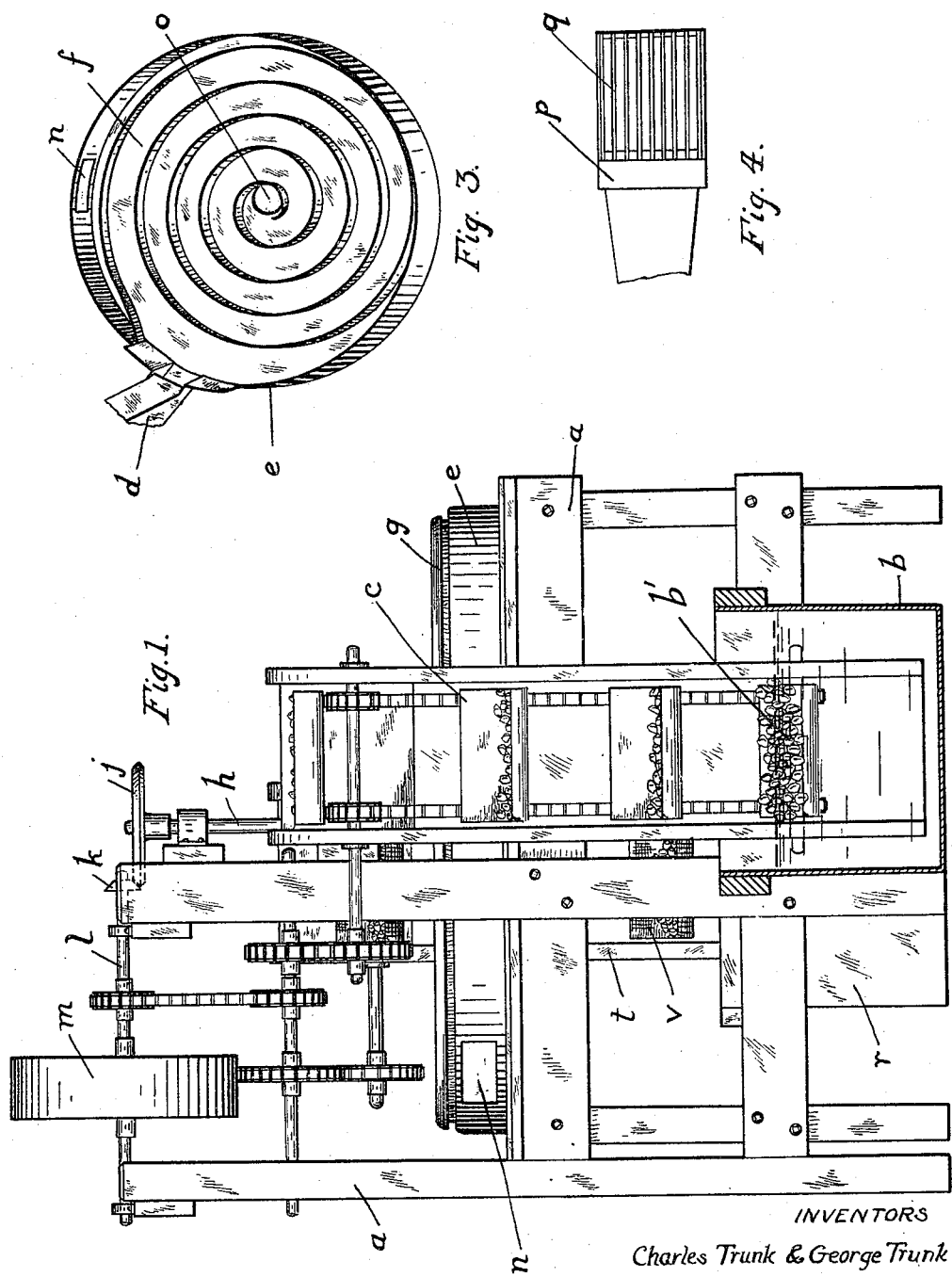
INVENTORS
Charles Trunk & George Trunk
BY
T. J. Geisler
ATTORNEY.

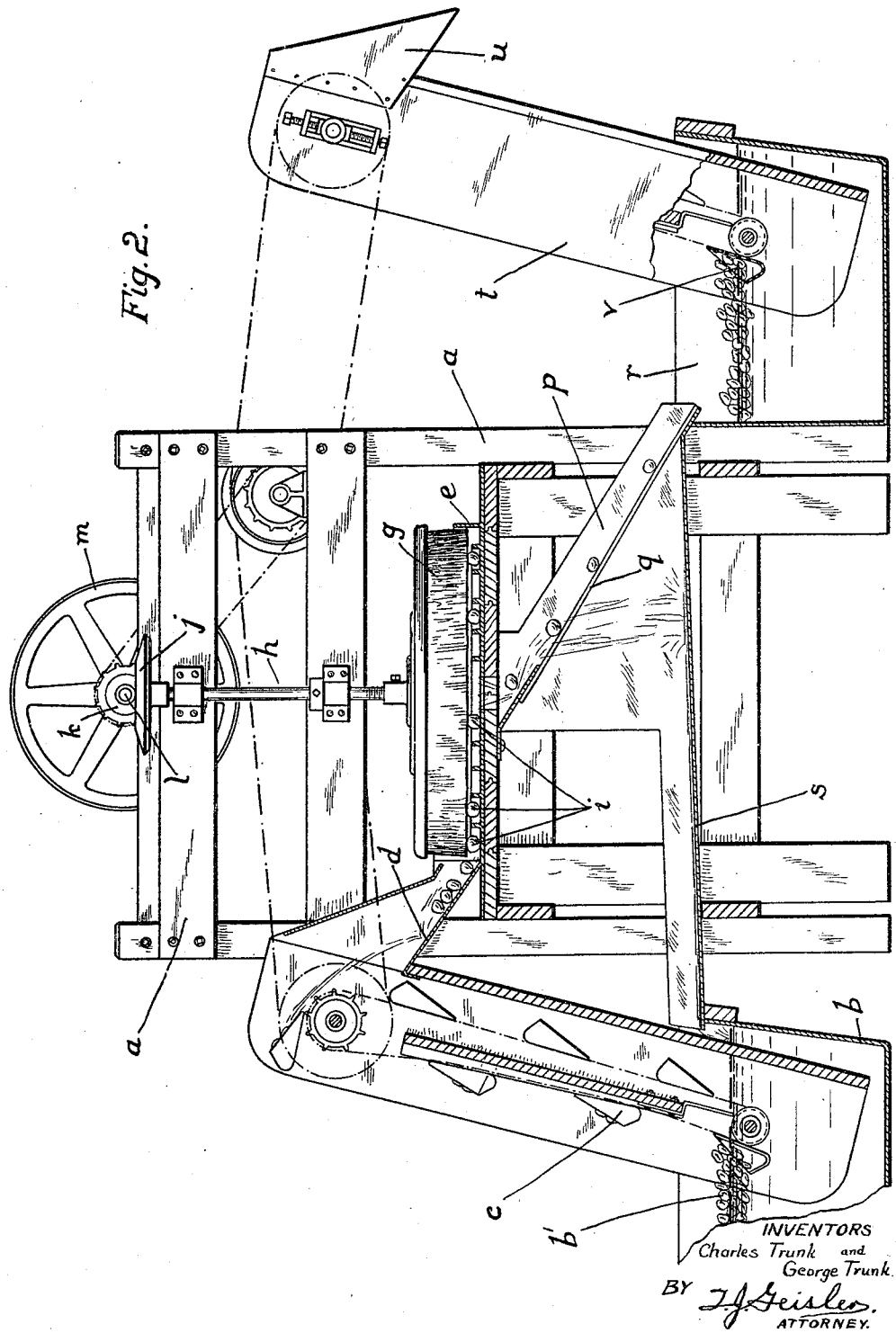

UNITED STATES PATENT OFFICE.

CHARLES TRUNK AND GEORGE TRUNK, OF DUNDEE, OREGON.

NUT SCOURING AND POLISHING MACHINE.

1,231,100.        Specification of Letters Patent.       Patented June 26, 1917.

Application filed December 15, 1916. Serial No. 137,237.

*To all whom it may concern:*

Be it known that we, CHARLES TRUNK and GEORGE TRUNK, citizens of the United States, and residents, respectively, of Dundee, Yamhill county, State of Oregon, have invented a certain new and useful Improvement in Nut Scouring and Polishing Machines, of which the following is a specification.

The object of our invention is to provide a nut cleaning machine especially adapted for operating on such nuts as walnuts, the shells of which are more or less covered with loose fiber and dirt, and impregnated with a powerful acid stain which badly discolors the hands, all of which matter should be removed and the shells of the nuts be thoroughly cleaned before the nuts are marketed. A further object of our invention is to provide an efficient machine of simple construction, reliable in its action, which is easily built and may be sold at a low cost, and, is, further, economical and convenient to operate on the farm.

We attain our object in a machine embodying the following devices: A scouring pan is adapted for holding water and is provided with a circuitous runway leading to a discharge outlet; means are provided for feeding the nuts and water to the inlet end of said runway; and a mechanically driven brush scours the nuts while traveling in the runway of the scouring pan, and in so doing moves the nuts to the discharge end of said runway, from which the nuts are dropped into a rinsing trough, and are finally removed from the latter by a suitable conveyer. The same machine may also be effectively used for polishing the nuts.

The details of construction and operation of our machine are hereinafter fully described, reference being had to the accompanying drawings, in which:

Figure 1 is a side elevation of our machine;

Fig. 2 is a sectional front elevation of our machine;

Fig. 3 is a perspective view of the type of scouring pan used in our machine; and Fig. 4 is a detailed view of the chute provided with a sieve bottom, onto which are discharged the water and nuts from the outlet of the scouring pan.

$a$ represents the frame of our machine upon which all other parts are mounted. $b$ is a receiving trough which is first partly filled with water, and then nuts $b'$ are thrown in. An elevator $c$ and a chute $d$ convey the nuts and water directly into the receiving end of the scouring pan $e$, the latter being also adapted for holding water. This pan contains a circular outer wall and a horizontal, spiral runway $f$, as shown in Fig. 3, the walls of the spiral runway being of relatively less height than the outer wall of the pan. A circular brush $g$ is set in the pan by a shaft $h$, said brush being vertically rotatable on the shaft so as to have the bristles bear with sufficient force on the nuts $i$. The brush $g$ is rotated horizontally in the pan $e$ through the medium of the shaft $h$, bevel gears $j$ and $k$, the horizontal shaft $l$, and the drive wheel $m$, the latter being in turn driven by any suitable prime mover. A glass inspection window $n$, in the outer wall of the pan $e$, provides a means whereby the operator can regulate the proper vertical adjustment of the brush $g$ and incidentally inspect the operation of the same. With the rotation of the brush $g$ the nuts $i$ are scrubbed and rolled along in the runway $f$ of the pan $e$, and the nuts are finally discharged through the discharge opening $o$ in the center of the pan.

Below the discharge opening $o$ is a chute $p$, the runway of which is composed of a grating $q$, as shown in Fig. 4, through which the water, dirt, and all other materials removed from the nuts, pass. The cleansed nuts, however, are retained on the grating $q$ and are finally deposited in the rinsing trough $r$. An inclined trough $s$, located under the grating $q$ of the chute $p$, carries the foreign matter and water back to the receiving trough $b$.

The scoured nuts are given a final rinsing in the rinsing trough $r$, and are then conveyed away from the machine by the elevator $t$ and chute $p$. The elevator $t$ comprises a plurality of wire-mesh or perforated buckets $v$, which drain the rinsing water from the nuts and allow the latter to be delivered in a fairly dry state.

If the nuts are also to be polished, the water is removed from the troughs $b$ and $r$, and the nuts run through the machine a second time for polishing.

We claim:

1. In a machine of the character described, the combination of a scouring pan adapted for holding water and provided with a spiral runway leading to a discharge opening, means for feeding material to be scoured and water to the inlet end of said scouring pan, and a rotatable scouring brush bearing in said scouring pan.

2. In a machine of the character described, the combination of a scouring pan adapted for holding water and provided with a spiral runway leading to a discharge opening, means for feeding material to be scoured and water to the inlet end of said scouring pan, and a rotatable scouring brush bearing in said scouring pan, the walls of the runway of the latter being of much lesser height than the rim wall of the scouring pan.

3. In a machine of the character described, the combination of a scouring pan adapted for holding water and provided with a spiral runway leading to a discharge opening, and a rotatable scouring brush bearing in said scouring pan.

4. In a machine of the character described, the combination of a scouring pan adapted for holding water and provided with a spiral runway leading to a discharge opening, and a rotatable scouring brush bearing in said scouring pan, the walls of the runway of the latter being of much lesser height than the rim wall of the scouring pan.

5. In a machine of the character described, the combination of a scouring pan adapted for holding water and provided with a spiral runway leading to a discharge opening, and a rotatable and adjustable scouring brush bearing in said scouring pan, the walls of the runway of the latter being of much lesser height than the rim wall of the scouring pan, the latter being provided with an inspection opening.

CHARLES TRUNK.
GEORGE TRUNK.

Copies of this patent may be obtained for five cents each, by addressing the "Commissioner of Patents, Washington, D. C."